United States Patent
Chen et al.

(10) Patent No.: US 10,884,905 B2
(45) Date of Patent: Jan. 5, 2021

(54) TEST SCRIPT CREATION BASED ON ABSTRACT TEST USER CONTROLS

(71) Applicant: Hewlett-Packard Development Company, L.P., Houston, TX (US)

(72) Inventors: Bo Chen, Shanghai (CN); Jin-Feng Luan, Shanghai (CN); Dror Saaroni, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 14/761,574

(22) PCT Filed: Feb. 1, 2013

(86) PCT No.: PCT/CN2013/071264
§ 371 (c)(1),
(2) Date: Jul. 16, 2015

(87) PCT Pub. No.: WO2014/117387
PCT Pub. Date: Aug. 7, 2014

(65) Prior Publication Data
US 2015/0363301 A1    Dec. 17, 2015

(51) Int. Cl.
*G06F 11/36* (2006.01)
*G06F 8/10* (2018.01)
*G06F 3/0484* (2013.01)

(52) U.S. Cl.
CPC ...... *G06F 11/3684* (2013.01); *G06F 3/04847* (2013.01); *G06F 8/10* (2013.01); *G06F 11/3664* (2013.01)

(58) Field of Classification Search
CPC ....... G06F 11/36–3696; G06F 3/04847; G06F 8/10–20; G06F 8/73; G06F 11/3664–3688
See application file for complete search history.

(56) References Cited

U.S. PATENT DOCUMENTS

| | | | | |
|---|---|---|---|---|
| 4,819,233 A | * | 4/1989 | Delucia | G06F 11/3688 714/E11.209 |
| 5,600,789 A | * | 2/1997 | Parker | G06F 11/3688 714/38.11 |

(Continued)

FOREIGN PATENT DOCUMENTS

| CN | 1713149 | 12/2005 |
|---|---|---|
| CN | 101425012 A | 5/2009 |
| WO | WO-2006022681 A1 | 3/2006 |

OTHER PUBLICATIONS

"Test Your DotNet GUI with NUnit and Mock Objects"; CodeFez website (codefez.com) as captured by the Wayback Machine Internet Archive (archive.org) on Apr. 28, 2010, pp. 1-7 (Year: 2010).*

(Continued)

*Primary Examiner* — S. Sough
*Assistant Examiner* — Zheng Wei

(57) ABSTRACT

The life cycle of an application can be shortened by initiating the creation of a mock-up test script before the development of an application is complete. The concurrent creation of the mock-up test script and the application can reduce a time associated with the life cycle of an application. Mock-up test script creation is based on the user interface (UI) specification and a mock-up graphical user interface (GUI) without business logic. Test script creation can include associating a functional specification and a UI specification with a proposed application and creating a mock-up GUI for testing based on the UI specification. Test script creation can include developing an application based on the proposed application that includes a logic based on the functional specification and a GUI based on the UI specification and creating a mock-up test script based on the mock-up GUI and not based on the logic, the functional specification, and the GUI.

13 Claims, 5 Drawing Sheets

(56) References Cited

U.S. PATENT DOCUMENTS

| | | | | |
|---|---|---|---|---|
| 5,754,755 | A * | 5/1998 | Smith, Jr. | G06F 11/3684 714/38.1 |
| 5,781,720 | A * | 7/1998 | Parker | G06F 11/3688 714/38.11 |
| 5,905,856 | A * | 5/1999 | Ottensooser | G06F 11/3688 714/38.1 |
| 5,933,634 | A * | 8/1999 | Enokido | G06F 8/33 715/234 |
| 5,983,001 | A * | 11/1999 | Boughner | G06F 9/45512 714/38.1 |
| 6,002,869 | A * | 12/1999 | Hinckley | G06F 11/3696 714/35 |
| 6,038,378 | A * | 3/2000 | Kita | G06F 11/3684 714/38.11 |
| 6,243,835 | B1 * | 6/2001 | Enokido | G06F 11/28 714/33 |
| 6,601,017 | B1 * | 7/2003 | Kennedy | G06F 11/3684 702/182 |
| 6,986,125 | B2 | 1/2006 | Apuzzo et al. | |
| 7,076,713 | B1 * | 7/2006 | Hess | G06F 11/263 714/741 |
| 7,093,238 | B2 * | 8/2006 | Givoni | G06F 11/3664 714/E11.208 |
| 7,099,663 | B2 | 8/2006 | Lundblade et al. | |
| 7,140,005 | B2 * | 11/2006 | Maliszewski | G06F 21/54 713/190 |
| 7,272,752 | B2 * | 9/2007 | Farchi | G06F 11/3676 714/37 |
| 7,272,753 | B2 * | 9/2007 | Kaplan | G06F 11/3692 714/38.1 |
| 7,624,380 | B2 * | 11/2009 | Okada | G06F 11/3414 714/33 |
| 7,895,575 | B2 * | 2/2011 | Yoon | H04L 41/145 717/124 |
| 7,949,901 | B2 * | 5/2011 | Yano | G06F 11/263 714/33 |
| 7,996,819 | B2 | 8/2011 | Okada | |
| 8,352,903 | B1 * | 1/2013 | Friedman | G06F 8/30 717/100 |
| 8,365,147 | B2 * | 1/2013 | Grechanik | G06F 8/70 714/37 |
| 8,423,962 | B2 * | 4/2013 | Becker | G06F 11/3684 717/124 |
| 8,479,154 | B1 * | 7/2013 | Friedman | G06F 8/30 717/100 |
| 8,572,570 | B2 * | 10/2013 | Grechanik | G06F 11/3696 717/124 |
| 8,627,295 | B2 * | 1/2014 | Foley | G06F 11/3684 717/127 |
| 8,707,269 | B1 * | 4/2014 | Kondreddy | G05B 23/0216 700/29 |
| 8,875,103 | B2 * | 10/2014 | Yun | G06F 9/4448 702/186 |
| 8,954,929 | B2 * | 2/2015 | Braude | G06F 11/3688 717/124 |
| 8,997,053 | B2 * | 3/2015 | Yanes | G06F 11/3664 717/125 |
| 9,009,672 | B2 * | 4/2015 | Grechanik | 717/124 |
| 9,047,413 | B2 * | 6/2015 | Romdhane | G06F 11/3684 |
| 9,122,799 | B1 * | 9/2015 | Elgarat | G06F 11/3664 |
| 9,170,784 | B1 * | 10/2015 | Friedman | G06F 8/30 |
| 9,213,613 | B2 * | 12/2015 | Trisjono | G06F 11/2252 |
| 9,448,915 | B2 * | 9/2016 | Brown | G06F 11/3664 |
| 9,477,582 | B2 * | 10/2016 | Levi | G06F 8/10 |
| 2001/0027383 | A1 * | 10/2001 | Maliszewski | G06F 21/54 702/188 |
| 2001/0028359 | A1 | 10/2001 | Muraishi | |
| 2002/0100015 | A1 * | 7/2002 | Harel | G06F 8/10 717/104 |
| 2003/0037314 | A1 * | 2/2003 | Apuzzo | G06F 11/3696 717/125 |
| 2003/0159089 | A1 * | 8/2003 | DiJoseph | G06F 11/3684 714/38.1 |
| 2003/0236775 | A1 * | 12/2003 | Patterson | G06F 11/368 |
| 2004/0130564 | A1 * | 7/2004 | Smith | G06F 9/4443 715/705 |
| 2004/0205703 | A1 * | 10/2004 | Harel | G06F 8/10 717/109 |
| 2005/0229190 | A1 * | 10/2005 | Peters | G06F 8/38 719/331 |
| 2006/0005079 | A1 * | 1/2006 | Kaplan | G06F 11/3692 714/38.1 |
| 2006/0212756 | A1 * | 9/2006 | Emek | G01R 31/318385 714/30 |
| 2007/0234121 | A1 * | 10/2007 | He | G06F 11/3684 714/33 |
| 2007/0234224 | A1 * | 10/2007 | Leavitt | B60K 35/00 715/762 |
| 2008/0072100 | A1 * | 3/2008 | Okada | G06F 11/3414 714/28 |
| 2008/0127101 | A1 * | 5/2008 | Anafi | G06F 11/3664 717/125 |
| 2008/0127103 | A1 * | 5/2008 | Bak | G06F 11/3688 717/126 |
| 2008/0154663 | A1 * | 6/2008 | Savur | G06Q 10/06311 705/7.13 |
| 2008/0295076 | A1 * | 11/2008 | McKain | G06F 9/4443 717/124 |
| 2009/0077537 | A1 * | 3/2009 | Chung | G06F 11/3684 717/124 |
| 2009/0217250 | A1 * | 8/2009 | Grechanik | G06F 8/36 717/136 |
| 2009/0217302 | A1 | 8/2009 | Grechanik | |
| 2009/0217303 | A1 * | 8/2009 | Grechanik | G06F 8/38 719/320 |
| 2010/0037210 | A1 | 2/2010 | Okada | |
| 2011/0173587 | A1 * | 7/2011 | Detwiller | A63F 13/63 717/109 |
| 2011/0173590 | A1 * | 7/2011 | Yanes | G06F 11/3664 717/125 |
| 2011/0239194 | A1 * | 9/2011 | Braude | G06F 11/3688 717/124 |
| 2011/0283261 | A1 * | 11/2011 | Yun | G06F 11/3684 717/124 |
| 2011/0307864 | A1 * | 12/2011 | Grechanik | G06F 11/3604 717/124 |
| 2012/0131476 | A1 | 5/2012 | Mestres | |
| 2012/0151433 | A1 * | 6/2012 | Amodio | G06F 8/38 717/105 |
| 2012/0266024 | A1 * | 10/2012 | Jackson | G06F 21/577 714/35 |
| 2012/0266136 | A1 * | 10/2012 | Brown | G06F 11/3664 717/124 |
| 2013/0145351 | A1 * | 6/2013 | Tunik | G06F 9/4443 717/135 |
| 2013/0159784 | A1 * | 6/2013 | Rossi | G06F 11/263 714/47.1 |
| 2014/0101640 | A1 * | 4/2014 | Romdhane | G06F 11/3684 717/125 |
| 2015/0234732 | A1 * | 8/2015 | Levi | G06F 11/3684 717/125 |
| 2015/0324275 | A1 * | 11/2015 | Luan | G06F 11/3692 717/124 |

OTHER PUBLICATIONS

Pasternak et al., GenUTest: a unit test and mock aspect generation tool, published by Springer, Int J Softw Tools Technol Transfer (2009) p. 273-290 (Year: 2009).*

Extended European Search Report dated Jul. 6, 2016, EP Patent Application No. 13873809.1 dated Jul. 29, 2015, European Patent Office.

Anaskure, P., "Functional Test Automation," (Research Paper), White Paper, Mar. 26, 2009, 15 pages, available at http://products.geometricglobal.com/solutions/downloads/Geometric_Functional_Test_Automation_White_Paper_March_2009.pdf.

(56) References Cited

OTHER PUBLICATIONS

International Search Report & Written Opinion received in PCT Application No. PCT/CN2013/071264, dated Nov. 7, 2013, 6 pages.
Jovic, M., et al., "Automating Performance Testing of Interactive Java Applications," (Research Paper), Proceedings of the 5th Workshop on Automation of Software Test, May 3-4, 2010, available at http://sape.inf.usi.ch/sites/default/files/publication/ast10.pdf.
Pettichord, B., "Seven Steps to Test Automation Success," (Research Paper), Jun. 26, 2001, 17 page, available at http://www.testpoint.com.au/attachments/093_Seven%20Steps%20to%20Test%20Automation%20Success.pdf.

* cited by examiner

TEST SCRIPT CREATION BASED ON ABSTRACT TEST USER CONTROLS

BACKGROUND

The life cycle of an application can begin at a designing stage and can end at an execution stage of the application. An application is tested before it is distributed to customers. The testing of an application can find flaws in the application before the application is distributed to customers. Finding flaws and resolving the flaws can provide for a more enjoyable user experience than if the flaws are not resolved.

DETAILED DESCRIPTION

Figure 1:
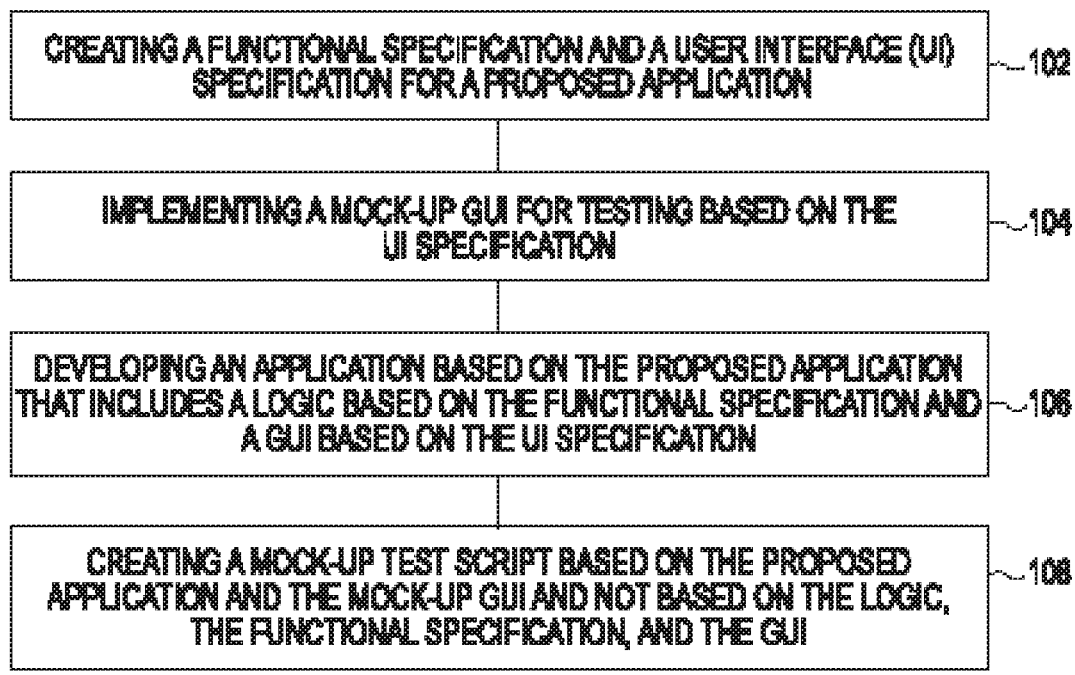
FIG. 1 is a flow chart illustrating an example of a method for test script creation according to the present disclosure.

The life cycle of an application can be shortened by initiating the creation of a mock-up test script before the development of an application is complete. The concurrent creation of the mock-up test script and the application can reduce a time associated with the life cycle of an application. Shortening the time associated with the life cycle of an application can allow the application to be developed and tested in a shorter amount of time than if the developing and testing of an application is performed sequentially.

A life cycle of an application can define a number of stages associated with the creation and deployment of an application. For example, a life cycle can include a design stage, a development stage, a testing stage, and/or a deployment stage, among other stages. As used herein, a design stage can include the conception and the creation of a design for an application. As used herein, the conception and the creation of a design for an application can include the conception of a logic that is associated with an application and the conception of a design for a graphical user interface (GUI). A conceptualized logic and a conceptualized GUI is referred to herein as a functional specification and a user interface (UI) specification, respectively. The functional specification and the UI specification can be included in a proposed application.

The creation of a logic that is associated with an application can define what the application does. For example, a logic for a calculator application can perform a number of operations that are associated with mathematics. The logic for a calculator application can include addition logic, subtraction logic, multiplication logic, and/or division logic, among other types of logic. In various examples, logic for a login application can have logic associated with verifying that the information received from the user corresponds to the information of a user that has a number of rights and/or privileges.

The creation of a design for a GUI can include identifying a number of user controls that will be associated with a GUI. For example, a user control can be associated with a GUI when a user control is displayed on the GUI and/or when the GUI references the user control. Furthermore, the creation of a design for a GUI can also include defining a number of attributes that are associated with the number of user controls. For example, a button user control can have a number of attributes that determine whether the button is shown, whether the button has a focus, whether text is associated with the button, and/or whether a number of events are associated with the button, among other attributes. The creation of a design for a GUI can also include defining a number of activities that can be associated with the GUI user controls. For example, a number of activities associated with a button user control can include performing an operation, e.g., addition, subtraction, multiplication, that is associated with a calculator application.

In a number of previous approaches, the testing stage of the life cycle of an application does not begin until the development stage has concluded. The testing stage and the development stage are performed in a sequential order. In a number of examples of the present disclosure, the testing stage and the development stage can be performed concurrently. A concurrent performance of the testing stage and the development stage can be enabled by a mock-up GUI for testing that allows a mock-up test script to be created while the application is being developed.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 is a flow chart illustrating an example of a method for test script creation according to the present disclosure. At 102, a functional specification and a UI specification are associated with a proposed application.

The proposed application can be a plan for how an application will look and how the application will function. The look of the application can be defined by a UI specification. The UI specification can define a number of proposed user controls. The functional specification can define a core function of the proposed application. The core function of a proposed application can be a functional specification that receives input from the UI specification and a functional specification that sends an output to the UI specification.

As used herein, a proposed application can be independent of a specific programming language. A proposed application defines the UI specification, the proposed user controls, and/or the functional specification generally because the proposed application is not identified with a specific programming language. For example, general details about a user control can define that the user control is to be a button user control and that one of the properties of the button user control is a string with the value "login." However, a proposed application may not define the position of the button user control within the UI specification and/or a number of other attributes that can be associated with the button user control.

Figure 3:
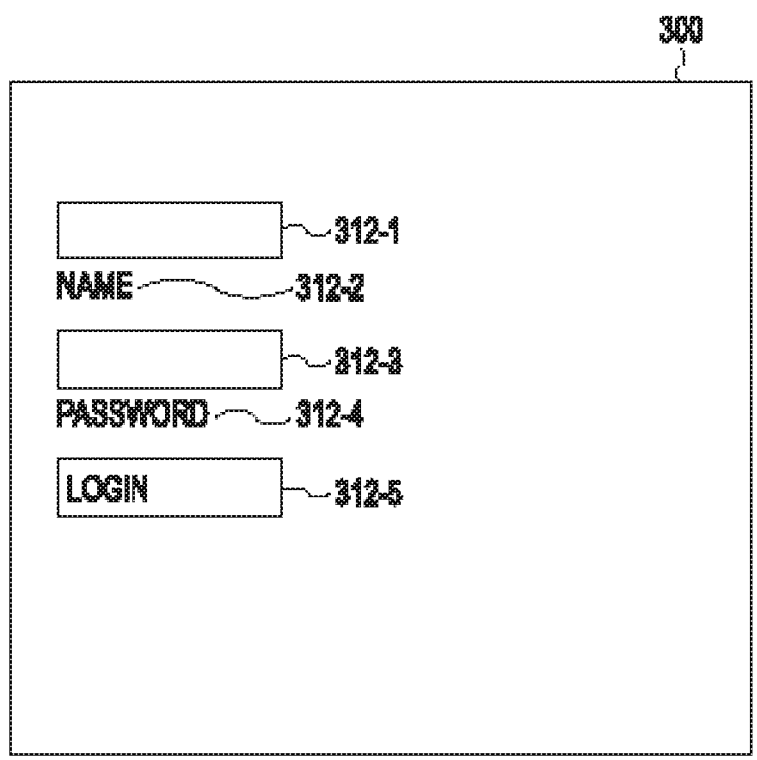
FIG. 3 is a diagram illustrating an example of a mock up GUI for testing according to the present disclosure.

At 104, a mock-up GUI for testing that includes a mock-up GUI based on the UI specification is created. A mock-up GUI for testing may be developed without associating the functional specification with the mock-up GUI. For example, the mock-up GUI can receive input from a user and not forward the input to an associated logic unit. A mock-up GUI can be a template that mirrors an applications GUI. A mock-up GUI can include a number of abstract test user controls. An abstract test user control that is associated with a mock-up GUI can be different than a user control that is associated with a GUI. FIG. 3 shows an example of a mock-up GUI for testing.

A user control can be associated with a particular class in an object oriented language or a collection of attributes. A user control can be a button user control, a radial button user control, and/or an image user control among other types of user controls. For example, a button user control can be a user control with a button type. A type can be associated with a specific class and/or method that defines the attributes that are associated with the user control. For example, a button user control can have a label attribute and/or an event attribute, among other attributes. A label attribute describes text that is displayed on a button user control. An event attribute describes an event that is initiated when a user selects, e.g., user clicks on, the button user control. In contrast, a text field user control can have a text attribute.

The method that is associated with a user control and/or a type can also define the naming convention of the attributes and/or the user control as specified by a programming language. For example, a button user control in a first programming language can follow a first naming convention. For example, a first naming convention can be "Button (String label)", wherein "Button" is the naming convention of the user control and "String label" is the naming convention of the label attribute, among other attributes. A button user control in a second programming language can follow a second naming convention. For instance, a second naming convention can be "<Control type='button'>ClickMe</Control>", wherein "<Control type='button'></Control>" is the naming convention of the user control and "ClickMe" is the text that is displayed on the user control.

In contrast, an abstract test user control can be a representation of the user control that are of a specific type, e.g., button, label, checkbox, among other types, wherein the abstract test user control contains the generalized attributes. In a number of examples, the abstract test user control can be divided into different abstract test user control, e.g., button abstract test user control and label abstract test user control, among other types of abstract test user controls. For example, an abstract test user control can have a button type, a label type, and/or a text field type. However, the abstract test user control with a button type can have a limited set of attributes. For example, a button user control that is an abstract test user control can have only one attribute, a label attribute, and no other attributes. The limited set of attributes associated with an abstract test user control can define general attributes that are relevant to all user controls of a specific type in a number of different programming languages. For example, a limited set of attributes associated with an abstract test user control with a button type can define general attributes that are relevant to all user controls of button type in a number of different programming languages.

In a number of examples, an abstract test user control can be associated with a single type and all abstract test user controls can have a limited set of attributes. For example, all abstract user controls can have a text attribute and/or a show attribute or a sting attribute and/or an isEnabled attribute, a label attribute, and/or an event attribute, for example. A label attribute can be text that is associated with the abstract user control type and an isEnabled attribute can determine whether the button can be clicked, for instance. An event attribute can define an action that is taken when a user interacts with an associated abstract test user control. Other limited sets of attributes can be associated with an abstract test user control.

At 106, an application based on the proposed application that includes a logic based on the functional specification and a GUI based on the UI specification can be implemented. In a number of examples, a mock-up GUI for testing can be developed in less time than an application can be developed because a mock-up GUI for testing does not include a representation of the functional specification and because the mock-up GUI for testing includes a limited representation of the UI specification. For example, a proposed login application that authenticates a user can have a functional specification that is associated with determining whether the user has a number of privileges. The mock-up GUI for testing can include a mock-up GUI that has a number of abstract test user controls that are associated with receiving information from a user and not the functional specification that determines whether the information provided from the user coincides with information that is associated with a user that has a number of privileges. Furthermore, a mock-up GUI can be based on a UI specification without including a representation of all of the proposed user controls that are associated with the UI specification whereas an application can include a representation of all of the proposed user control in the form of user controls.

At 108, a mock-up test script based on the mock-up GUI and not based on the logic, the functional specification, and the GUI, can be created. The development of the mock-up test script at 108 can begin while the application is being developed at 106. In a number of examples, development of the mock-up test script can conclude before development of the application concludes. In various examples, development of the mock-up test script can conclude after development of the application concludes.

A mock-up test script and a test script can be created manually and/or interactively. For example, a user can create a mock-up test script and a test script by developing machine-readable instructions (MRI) that can be used to interact with a mock-up GUI and/or the GUI that is associated with the application. A mock-up test script can also be created by recording a user's interactions with the mock-up GUI for testing. A test script can be created by recording a user's interactions with the application. Interacting with the mock-up GUI can provide a structure that can be used to test the application. For example, interacting with the mock-up GUI can be associated with a mock-up test script that includes a structure with a first step of entering text into a first abstract test user control, a second step of entering text into a second abstract test user control, and/or a third step of selecting a third abstract test user control.

A test script and/or a mock-up test script can define a number of interactions with the abstract architecture and/or the application. A test script and/or a mock-up test script can also define a number of results that are associated with the abstract architecture and/or the application. For example, a structure that is associated with the mock-up test script can have expected results if applied to a mock-up GUI that includes expected results and/or a test script can have a particular expected result if applied to a GUI that is associated with the application.

In a number of examples, the mock-up test script can be executed on the mock-up GUI for testing while the test script can be executed on the application. The test script can be executed on the application by converting a number of abstract test user controls, in the mock-up test script, that are associated with the mock-up GUI for testing to user controls that are associated with a specific programming language.

The conversion can include associating abstract test user controls with corresponding user controls. The association can be based on the attributes associated with the abstract test user control and the attributes associated with the user control. For example, an abstract test user control that has a text attribute with a "Name" value can be associated with a user control that has a label attribute with a "Name" value because a correlation can be made between the text attribute and the label attribute.

The association of a number of the attributes, e.g., text attribute, can be enhanced with a user's input and/or can be performed without a user's input. For example, a user can indicate which abstract test user controls are associated with which user controls or the comparison can be performed without a user's input. In a number of examples, a pre-defined mapping, e.g., attribute mapping, can map a number of attributes of the abstract test user control to a number of attributes of the user controls as defined by a number of support programming languages. The association can search the attribute map and associate an attribute from the abstract user control with a corresponding attribute for a user control.

The conversion can include replacing an abstract test user control with a user control such that the abstract test user control is deleted and the user control is used in its place. The conversion can also include redefining the abstract test user control as a user control such that the abstract test user control is not deleted but changed to reflect the user control.

Figure 2:
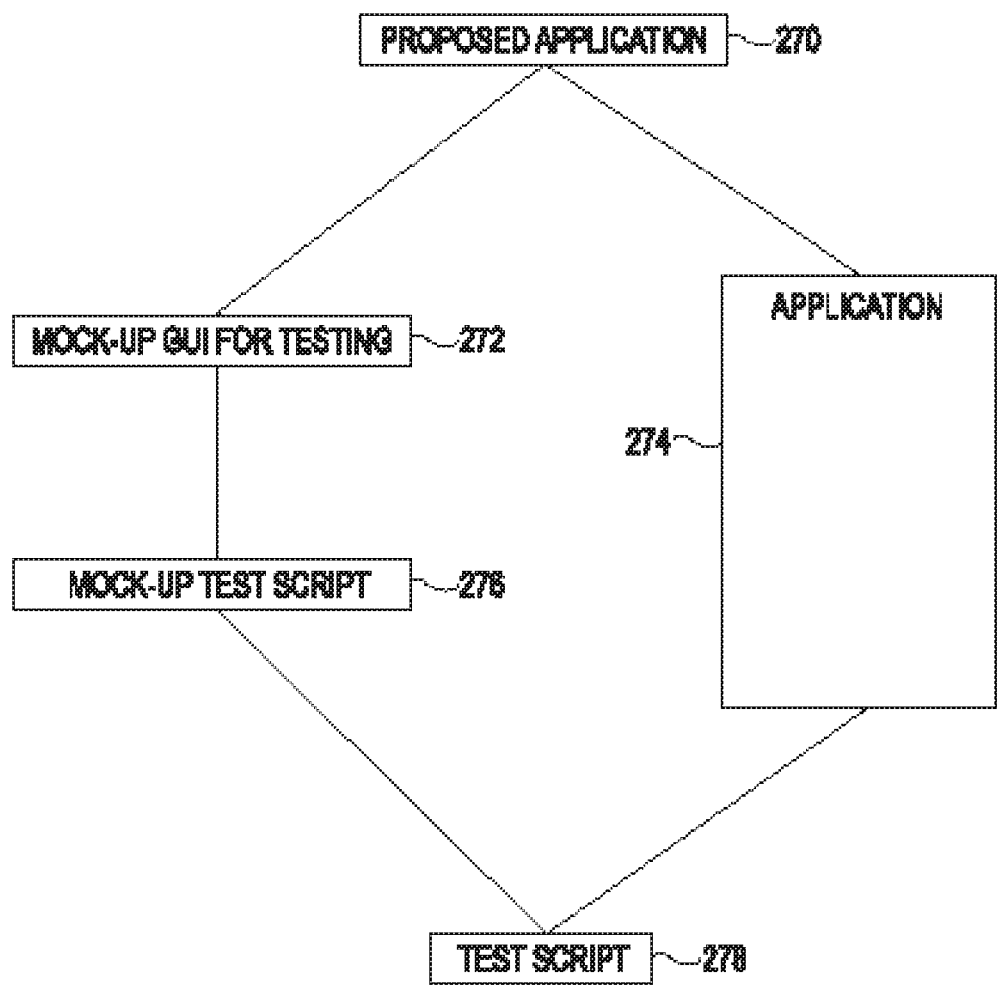
FIG. 2 is a flow chart illustrating test script creation according to the present disclosure.

FIG. 2 is a flow chart illustrating test script creation according to the present disclosure. FIG. 2 includes the development of a proposed application 270, a development of a functional architecture 274, a development of a mock-up GUI for testing 272, a development of a mock-up test script 276, and a development of a test script 278.

In FIG. 2 a time associated with the development of the application 270, a development of the mock-up GUI for testing 272, the development of an application 274, the development of a mock-up test script 276, and the development of a test script 278 is indicated by the length of the rectangle. For example, the development of a mock-up GUI for testing 272 can take less time than the time associated with the development of an application 274.

The development of a mock-up GUI for testing 272 and the development of a mock-up test script 276 can be performed concurrently with the development of an application 274. Developing the mock-up GUI for testing 272 and the mock-up test script 276 concurrently with the development of the application 274 can reduce the amount of time associated with conducting a number of tests on the application. A mock-up test script can be created based on the mock-up GUI for testing. A development of a test script 278 can begin after the development of the mock-up test script 276 and the development of the application 274 is concluded.

FIG. 3 is a diagram illustrating an example of a mock-up GUI for testing according to the present disclosure. A mock-up GUI for testing can include a mock-up GUI 300. A mock-up GUI 300 includes a number of abstract test user controls 312-1, 312-2, 312-3, 312-4, and 312-5, e.g., referred to generally as abstract test user controls 312.

The mock-up GUI 300 can be based on a proposed application and/or on a UI specification. The abstract test user controls 312 can be based on a number of proposed user controls. In the example of FIG. 3, the proposed application can be a login application.

The proposed user controls can include a number of text fields, labels, buttons, and/or graphics. The abstract test user controls 312 include abstract test user controls 312-1 and 312-3 that can represent text fields. The abstract test user control 312-1 can have a text attribute with a "Name" value and a show attribute with a "false" value, e.g., indicates that the text attribute is not displayed on the abstract test user control 312-1. The abstract test user control 312-3 can have a text attribute with a "Password" value and a show attribute with a "false" value.

The abstract test user controls 312-2 and 312-4 can represent labels. The abstract test user control 312-2 can have a text attribute with a "Name" value and a show attribute with a "true" value, e.g., indicates that the text attribute is displayed on the abstract test user control 312-2. The abstract test user control 312-4 can have a text attribute with a "Password" value and a show attribute with a "true" value. The abstract test user control 312-5 can represent a button. The abstract test user control 312-5 can have a text attribute with a "Login" value and a show attribute with a "true" value.

The mock-up GUI 300 can receive a number of user interactions. For example, the mock-up GUI 300 can allow a user to select, e.g., click, the abstract test user control 312-5. However, mock-up GUI 300 can be limited in that selecting the abstract test user control 312-5 can have no associated event, e.g., that is no representation of the functional specification.

The mock-up GUI 300 can include a representation, in the form of abstract test user controls 312, of some of the proposed user controls but not all of the proposed user controls. For example, the proposed application can define a cancel button, and graphics that are not represented in the mock-up GUI 300. Furthermore, the proposed application can define a login button that includes an image instead of the value "Login" as depicted in abstract test user controls 312-5 in mock-up GUI 300.

A mock-up test script can be created based on the mock-up GUI. For example, a user can interact with the mock-up GUI. A user's interaction can be recorded and associated with the mock-up test script. A user, for instance, can perform a first selection, e.g., a click, on the abstract test user control 312-1, a second selection on the abstract test user control 312-3, and a third selection on the abstract test user control 312-5. The first selection can be performed before the second selection which is performed before the third selection. The first selection, the second selection, and the third selection can be a structure, e.g., sequence of events, that is associated with the mock-up test script and/or the abstract test user controls 312.

In a number of examples, the mock-up test script can define a number of events initiated by a user and may check the expected results from the user defined events. For example, the structure can define the events initiated by a user and check the expected results of those events if the mock-up GUI 300 contains the result of the action. In a number of examples, the test script can define a number of events initiated by a user and a number of expected results.

Figure 4:
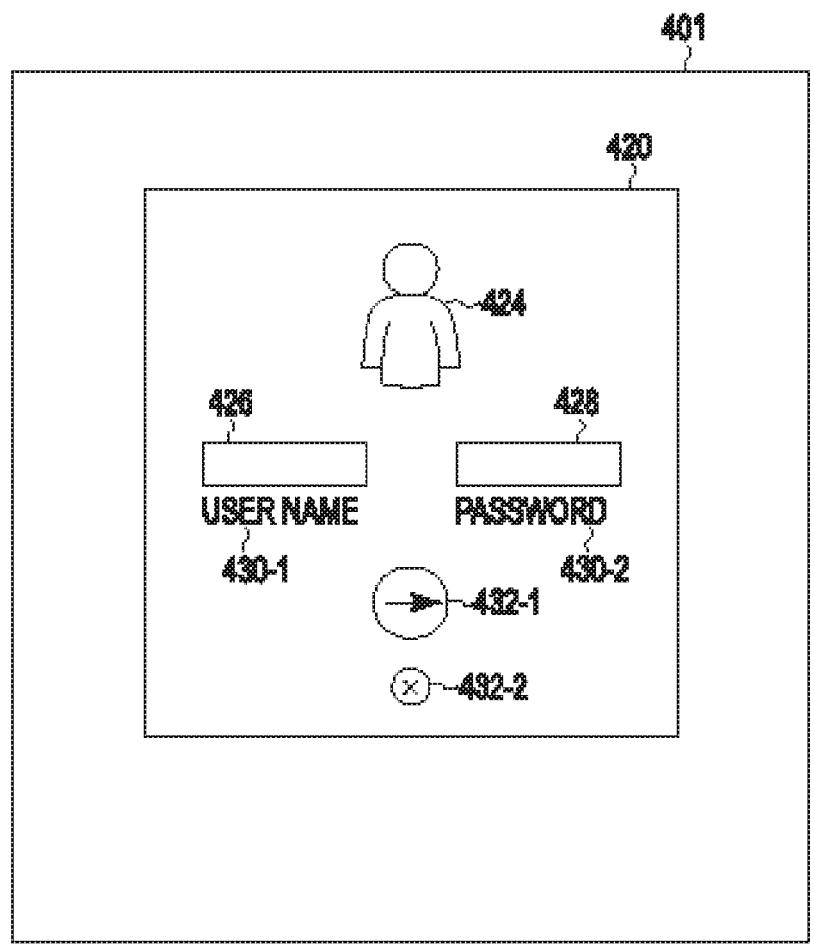
FIG. 4 is a diagram illustrating an example of an application according to the present disclosure.

FIG. 4 is a diagram illustrating an example of an application according to the present disclosure. An application can be based on the proposed application. An application can include logic and a GUI 401. The GUI 401 is different than the mock-up GUI 300 in FIG. 3 because representations of all of the proposed user controls that are described in the proposed application are included in the GUI 401 in the form of user controls. The user controls include a window user control 420, an image user control 424, text field user control 426, a password field user control 428, label user controls 430-1 and 430-2, and button user controls 432-1 and 432-2.

Each of the user controls can be associated with a class and/or method that are particular to a programming language. The class and/or method associated with the user controls can define a specific set of attributes. The label user controls 430-1 and 430-2 can have an attribute that defines a number of characters in the text that is associated with the label. The label user control 430-1 can have a text attribute with a "User Name" while the label user control 430-2 can have a text attribute with a "Password" value. The text field user control 426 can have a text attribute that can initially be empty, e.g. a " " value. The password field user control 428 can have a text attribute that can also initially be empty. The button user control 432-1 can have an image attribute that has an image with an arrow as shown. The button user control 432-2 can have an image attribute that has an image with an "x" as shown. The image user control 424 can have an image attribute with a user icon. The window user control 420 can be a rectangle with a length attribute and a width attribute. Each of the user controls can have more attributes than those listed. For example, each of the user controls can have a location attribute that defines the location of the user control within the GUI 401.

A mock-up test script that is based on the mock-up GUI for testing in FIG. 3 can be associated with a number of abstract test user controls, wherein the abstract test user controls are converted to user controls to create the test script. For example, the abstract test user control 312-1 in FIG. 3 can be converted to the text field user control 426, the abstract test user control 312-3 in FIG. 3 can be converted to the password field user control 428, the abstract test user control 312-2 in FIG. 3 can be converted to the label user control 430-1, the abstract test user control 312-4 in FIG. 3 can be converted to the label user control 430-2, and the abstract test user control 312-5 in FIG. 3 can be converted to a button user control 432-1. Each of the abstract test user controls 312 in FIG. 3 can be converted to user controls based on the attributes that are associated with the abstract test user controls 312 in FIG. 3 and the user controls. For example, the abstract test user control 312-2 that has a label attribute with a "Name" value can be associated with the label user control 430-1 that has a text attribute with a "User Name" value because the label attributes and the text attributes can be correlated based on their values. Furthermore, in cases in which an abstract test user control cannot be correlated with a user control based on their attribute, a user can provide input to correlate specific abstract test user controls with user controls.

The mock-up test script can further be enhanced before and/or after the abstract test user controls are converted. For example, a structure that is associated with the mock-up test script can be modified to include user controls that are not represented in the mock-up test script in the form of abstract test user controls to create the test script. The structure can be modified by including a selection of the button 432-2. The structure can also be modified by adding detail to the structure such as text input into the text field 426 and text input into the password field 428. The mock-up test script can be also be modified by including a number of expected results that are associated with the structure. The test script can then be used to test the application.

Figure 5:
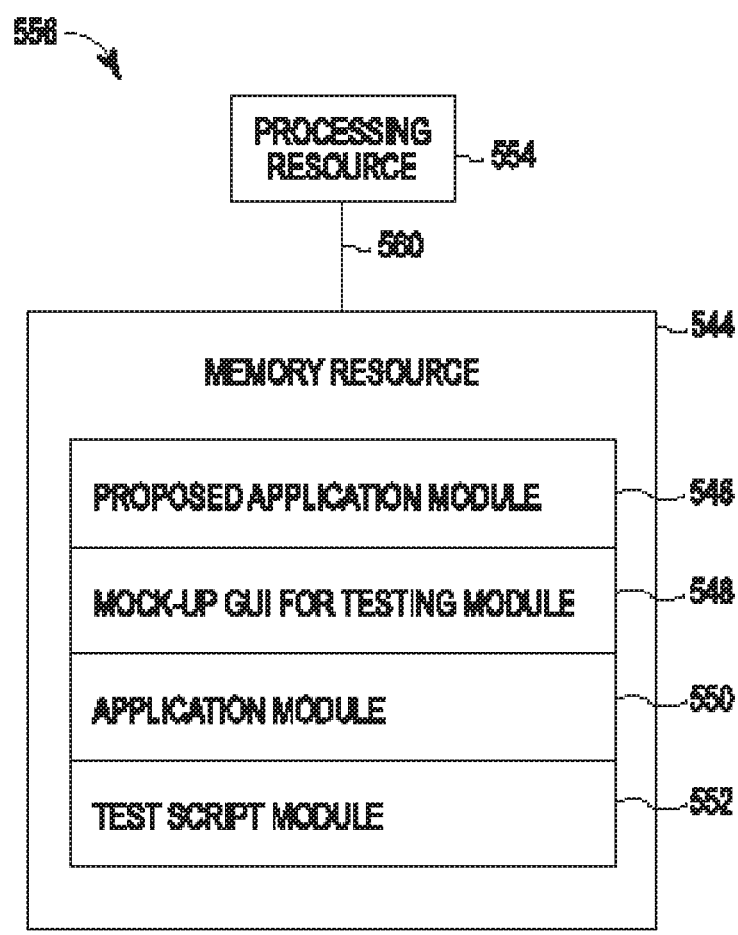
FIG. 5 is a diagram illustrating an example of a computing system according to the present disclosure.

FIG. 5 is a diagram illustrating an example of a computing system according to the present disclosure. The computing system 556 can utilize software, hardware, firmware, and/or logic to perform a number of functions.

The computing system 556 can be a combination of hardware and program instructions configured to perform a number of functions, e.g., actions. The hardware, for example, can include one or more processing resources 554 and other memory resources 544, etc. The program instructions, e.g., machine-readable instructions (MRI), can include instructions stored on memory resource 544 to implement a particular function, e.g., an action such as test script creation.

The processing resources 554 can be in communication with the memory resource 544 storing the set of MRI executable by one or more of the processing resources 554, as described herein. The MRI can also be stored in a remote memory managed by a server and represent an installation package that can be downloaded, installed and executed. A computing device 556, e.g., server, can include memory resources 544, and the processing resources 554 can be coupled to the memory resources 544 remotely in a cloud computing environment.

Processing resources 554 can execute MRI that can be stored on internal or external non-transitory memory 544. The processing resources 554 can execute MRI to perform various functions, e.g., acts, including the functions described herein among others.

As shown in FIG. 5, the MRI can be segmented into a number of modules, e.g., a proposed application module 546, a mock-up GUI for testing module 548, an application module 550, and a test script module 552, that when executed by the processing resource 554 can perform a number of functions. As used herein a module includes a set of instructions included to perform a particular task or action. The number of modules 546, 548, 550, and 552 can be sub-modules of other modules. For example, the proposed application module 546 and the mock-up GUI for testing module 548 can be sub-modules and/or contained within a single module. Furthermore, the number of modules 546, 548, 550, and 552 can comprise individual modules separate and distinct from one another.

In the example of FIG. 5, a proposed application module 546 can comprise MRI that are executed by the processing resources 554 to define a proposed application. The definition of a proposed application can include the definition of a UI specification and proposed user controls that are associated with the GUI. Defining proposed user controls can include defining a number of proposed attributes that are associated with the user control and/or events that are associated with the proposed user controls. Defining a proposed application can also include defining a functional specification that defines a number of core functions of the application.

A mock-up GUI for testing 548 can comprise MRI that are executed by the processing resources 554 to create a mock-up GUI. An abstract GUI for testing can include a mock-up GUI and abstract test user control that are associated with the mock-up GUI. The abstract test user controls have a limited number of attributes as compared to user controls that are associated with a GUI in the application. Abstract test user controls are different than user controls in that user controls are defined specific to a programming language while abstract test user control can be converted into a user control as defined by any number of programming languages. A mock-up GUI for testing 548 can be created concurrently with the creation of the application.

An application module 550 can comprise MRI that are executed by the processing resources 554 to create an application. An application can include logic that is based on the functional specification and a GUI that is based on the UI specification. An application can be created specific to a programming language. The programming language can dictate a number of attributes that are associated with user controls in the GUI.

Test script module 552 can comprise MRI that are executed by the processing resources 554 to create a test script. The mock-up test script can be created concurrently with the creation of the application. A mock-up test script can be based on the mock-up GUI for testing. A mock-up test script includes a structure, e.g., events initiated by a user on abstract test user controls in the mock-up GUI, that is associated with a number of abstract test user controls. The abstract test user controls that are associated with the structure and the mock-up test script can be converted to user controls to create a test script. The conversion can be based on the attributes associated with the abstract test user controls and the user controls. Attributes can include events which can be taken on the abstract test user controls and/or user controls, features of the abstract test user controls, and/or user controls, and/or characteristics of the abstract test user controls and/or user controls, among other types of attributes. After the conversion, the test script can be used to test the application.

A memory resource 544, as used herein, can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The memory resource 544 can be integral or communicatively coupled to a computing device in a wired and/or wireless manner. For example, the memory resource 544 can be an internal memory, a portable memory, and a portable disk, or a memory associated with another computing resource, e.g., enabling MRIs to be transferred and/or executed across a network such as the Internet.

The memory resource 544 can be in communication with the processing resources 554 via a communication path 560. The communication path 560 can be local or remote to a machine, e.g., a computer, associated with the processing resources 554. Examples of a local communication path 560 can include an electronic bus internal to a machine, e.g., a computer, where the memory resource 544 is one of volatile, non-volatile, fixed, and/or removable storage medium in communication with the processing resources 554 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 560 can be such that the memory resource 544 is remote from a processing resource, e.g., processing resources 554, such as in a network connection between the memory resource 544 and the processing resource, e.g., processing resources 554. That is, the communication path 560 can be a network connection. Examples of such a network connection can include local area network (LAN), wide area network (WAN), personal area network (PAN), and the Internet, among others. In such examples, the memory resource 544 can be associated with a first computing device and the processing resources 554 can be associated with a second computing device, e.g., a Java® server. For example, processing resources 554 can be in communication with a memory resource 544, wherein the memory resource 544 includes a set of instructions and wherein the processing resources 554 are designed to carry out the set of instructions.

As used herein, "a" or "a number or" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A system comprising:
   a processor;
   a non-transitory storage medium storing instructions executable on the processor to:
   create a mock-up graphical user interface (GUI) and a mock-up test script for an application concurrently with a development of the logic of a application by initiating the creation of the mock-up GUI based on a user interface (UI) specification of the application and the mock-up test script before the development of the logic of the application is complete, wherein the development of the logic of the application is based on a functional specification of the application, wherein the mock-up GUI includes test user controls to receive user input and not forward the user input to the logic of the application, and wherein the mock-up test script includes the test user controls associated with the mock-up GUI and is created based on the mock-up GUI and not based on a GUI of the application or the functional specification used to develop the logic of the application;
   create a test script for testing the application based on the mock-up test script, including converting the test user controls in the mock-up test script associated with the mock-up GUI to user controls of the GUI of the application, wherein converting the test user controls in the mock-up test script to the user controls of the GUI of the application comprises associating attributes of the test user controls in the mock-up test script with attributes of the user controls; and
   test the application by implementing the test script on the application and on the user controls.

2. The system of claim 1, wherein to associate the attributes of the test user controls with the attributes of the user controls, the instructions cause the processor to associate first properties associated with the test user controls with second properties associated with the user controls.

3. The system of claim 1, wherein the instructions are executable to modify the mock-up test script after the mock-up test script is created to create the test script that is based on the logic and the GUI of the application before the application is tested.

4. The system of claim 1, wherein the creating of the mock-up test script comprises recording user interaction with the mock-up GUI.

5. The system of claim 1, wherein when a first one of the test user controls displays a text, the instructions cause the processor to assign a true value to an attribute of the first test user control, and when a second one of the test user controls does not display a text, the instructions cause the processor to assign a false value to an attribute of the second test user control.

6. A non-transitory machine-readable medium storing instructions executable by a computer to cause the computer to:

create a mock-up graphical user interface (GUI) and a mock-up test script for an application concurrently with a development of a logic of the application by initiating the creation of the mock-up GUI based on a user interface (UI) specification of the application and the mock-up test script before the development of the logic of the application is complete, wherein the development of the logic of the application is based on a functional specification of the application, wherein the mock-up GUI includes test user controls to receive user input and not forward the user input to the logic of the application, and wherein the mock-up test script includes the test user controls associated with the mock-up GUI and is created based on the mock-up GUI and not based on a GUI of the application or the functional specification used to develop the logic of the application;

create a test script for testing the application based on the mock-up test script, including converting the test user controls in the mock-up test script associated with the mock-up GUI to user controls of the GUI of the application, wherein converting the test user controls in the mock-up test script to the user controls of the GUI of the application comprises correlating attributes of the test user controls in the mock-up test script with attributes of the user controls;

test the mock-up GUI by executing the mock-up test script on the mock-up GUI; and test the application by executing the test script on the application and on the user controls.

7. The non-transitory machine-readable medium of claim 6, wherein the test user controls represent user controls that are in a specific programming language.

8. The non-transitory machine-readable medium of claim 6, wherein to create the mock-up test script, the instructions cause the computer to record a user's manipulation of an input device to perform actions on the test user controls.

9. The non-transitory machine-readable medium of claim 6, wherein when a first one of the test user controls displays a text, the instructions are to cause the computer to assign a true value to an attribute of the first test user control, and when a second one of the test user controls does not display a text, the instructions cause the computer to assign a false value to an attribute of the second test user control.

10. A method executed by a computer system, comprising:

creating a mock-up graphical user interface (GUI) and a mock-up test script for an application concurrently with a development of a logic of the application by initiating the creating of the mock-up GUI based on a user interface (UI) specification of the application and the mock-up test script before the development of the logic of the application is complete, wherein the development of the logic of the application is based on a functional specification of the application, wherein the mock-up GUI includes test user controls to receive user input and not forward the user input to the logic of the application, and the mock-up test script includes the test user controls associated with the mock-up GUI, and wherein creating the mock-up test script is based on the mock-up GUI and not based on the logic, the functional specification, and a GUI of the application;

creating an application test script for testing the application based on the mock-up test script and the GUI of the application, including converting the test user controls in the mock-up test script associated with the mock-up GUI to user controls of the GUI of the application, wherein converting the test user controls in the mock-up test script to the user controls of the GUI of the application comprises correlating attributes of the test user controls in the mock-up test script with attributes of the user controls; and testing the application by executing the application test script on the application and on the user controls.

11. The method of claim 10, wherein the creating of the mock-up GUI is not based on the functional specification of the application.

12. The method of claim 10, wherein the creating of the application test script is further based on the functional specification of the application.

13. The method of claim 10, wherein creating the mock-up test script comprises recording user interaction with the mock-up GUI.

* * * * *